United States Patent [19]

Opal et al.

[11] Patent Number: 5,638,263
[45] Date of Patent: *Jun. 10, 1997

[54] LOW AND MEDIUM VOLTAGE PWM AC/DC POWER CONVERSION METHOD AND APPARATUS

[75] Inventors: Kenneth Opal, Oakmont; Harry Abrams, Pittsburgh; Peter Hammond, Greensburg, all of Pa.

[73] Assignee: Halmar Robicon Group, New Kensington, Pa.

[*] Notice: The term of this patent shall not extend beyond the expiration date of Pat. No. 5,625,545.

[21] Appl. No.: 351,822

[22] Filed: Dec. 8, 1994

Related U.S. Application Data

[63] Continuation-in-part of Ser. No. 203,803, Mar. 1, 1994.
[51] Int. Cl.$^6$ ................................................. H02M 7/515
[52] U.S. Cl. ....................................... 363/65; 363/71
[58] Field of Search .............................. 363/65, 67, 68, 363/69, 70, 71, 72

[56] References Cited

U.S. PATENT DOCUMENTS

| | | | |
|---|---|---|---|
| 4,181,932 | 1/1980 | Fujiwara | 363/68 |
| 4,674,024 | 6/1987 | Paice et al. | 363/71 |
| 5,008,797 | 4/1991 | Patel et al. | 363/65 |
| 5,434,770 | 7/1995 | Dreifuerst et al. | 363/65 |

FOREIGN PATENT DOCUMENTS 2-202324  8/1990  Japan .

OTHER PUBLICATIONS

Bimal K. Bose, Power Electronics—A Technology Review, Proceedings of the IEEE, vol. 80, No. 8, Aug. 1992.

Primary Examiner—Peter S. Wong
Assistant Examiner—Y. J. Han
Attorney, Agent, or Firm—Buchanan Ingersoll, P.C.

[57] ABSTRACT

A power supply apparatus and method for supplying direct current power to low and medium voltage DC loads wherein a multi-phase transformer having multiple secondary windings provides multi-phase power to multiple power cells, each of which have a single DC output and are controllable by a modulation controller. The primary and secondary windings in the power transformer may be star- or mesh-connected; the secondary windings may be shifted in phase. Because the power cells can be connected in series, the maximum output voltage for each cell may be less than the maximum line-to-line voltage. The power cell output can have variable DC voltage and current which can be controlled using pulse-width modulation techniques. AC input power is converted to DC output power for each power output line. Output power modulation can be produced by interdigitating a selected number of carrier signals so that harmonic components reflected back to the input are attenuated.

43 Claims, 10 Drawing Sheets

LOW AND MEDIUM VOLTAGE PWM AC/DC POWER CONVERSION METHOD AND APPARATUS

RELATED APPLICATION

This application is a continuation-in-part of co-pending application Ser. No. 08/203,803, filed Mar. 1, 1994, which is incorporated herein by reference. Co-pending application Ser. No. 08/203,803 is assigned to the assignee hereof.

BACKGROUND OF THE INVENTION

1. Field of the Invention

This invention relates to a variable AC-to-DC converter, and a method for operating a variable-DC power supply, particularly to AC-to-DC converters employing pulse-width modulation (PWM) conversion methods.

2. Description of the Art

In general, existing AC/DC power conversion is accomplished using a variety of circuit topologies with phase-controlled SCRs operating from multi-phase transformers. These topologies may sometimes have the drawbacks of harmonic line currents, a variable power factor, and high DC ripple currents. These traits are especially problematic at higher power levels typical for arc loads and plasma torches. Because of these and other disadvantages of the SCR circuit topology, pulse-width modulated (PWM) circuits are preferred to provide smoother control.

Pulse-width modulation is a form of modulation in which the value of each instantaneous sample of the modulating wave is caused to modulate the duration of a pulse. In PWM, the modulating wave may vary the time of occurrence of the leading edge, the trailing edge, or both edges of the pulse. The modulating frequency may be fixed or variable. In a PWM circuit, a reference signal may be used to generate a train of pulses, the width of each pulse being related to the instantaneous value of the referenced signal. The pulses may be generated by using a comparator to compare the reference signal with a carrier signal, which may be a sawtooth or triangular wave. When the reference signal exceeds the carrier signal, the output of the comparator is high; at other times, the output of the comparator is low. The comparator output does provide a train of pulses representing the reference signal. The pulses are then used to drive an electronic switching device for intermittently applying a voltage across the load.

When a voltage is suddenly applied across an inductive and resistive load, such as a plasma torch, the current through the load rises almost linearly with time. When the voltage is then turned off, the current through the load does not immediately fall to zero but decreases approximately linearly with time, as the inductor's magnetic field collapses, and the current flows in a freewheeling diode. Thus, the input voltage pulses applied across the load result in a current which has a ripple. This ripple is inherent in all PWM amplifiers. The magnitude of the ripple is directly proportional to the supply voltage and inversely proportional to the switching frequency and to the circuit inductance. Current ripple is generally undesirable because it wastes energy in the inductor and may cause unwanted pulsations in the load. To reduce ripple, the SCR controller typically increases the inductance in series with the load as well as increase chopping to a 12 or 24 pulse output. This is typically an expensive approach and further increases losses and injects harmonics via line notching on the power system. Pulse-width modulation techniques can reduce ripple by interdigitating multiple power cells to significantly increase the ripple frequency and reduce the ripple amplitude.

SUMMARY OF THE INVENTION

The invention provides for a PWM power converter for use with a DC load and a method for operating such a converter. The converter employs multiple series, parallel, or series/parallel-connected power cells in each power output line to the DC load. Three-phase AC input power can be supplied to each cell by way of at least one transformer. Each transformer may contain multiple three-phase secondary winding circuits, each of which may be dedicated to supply one corresponding power cell with three-phase AC power input. Alternatively, each secondary winding circuit may be configured to supply multiple power cells with three-phase AC power input. Each power cell can control the power that it supplies to the load using a PWM scheme. It may be desirable to lower the supply transformers K-factor and to reduce harmonics in the source currents. This can be accomplished by shifting the phase-angle of the secondary winding circuit either by zig-zag or extended delta windings, as shown.

Each power cell may contain an input AC-to-DC converter, a smoothing filter, an output DC chopper, and a control circuit. The input rectifier can accept three-phase input from a secondary winding circuit of the power transformer. The input rectifier transforms three-phase AC power into DC power with significant ripple. In particular power cell configurations, it is preferred that a single input rectifier provide DC power to multiple power cells. To ameliorate the effects of such ripple, a smoothing filter, preferably composed of electrolytic capacitors, may be connected to the DC side of the input rectifier. The smoothing filter also connects to the output chopper. It is preferred that the output chopper be semiconductor switches, in particular, power transistors, such as, for example, IGBTs. Each transistor of the output chopper may be operated by a local modulation control circuit. Signals that operate the local modulator control circuit may be brought to each power cell by fiber-optic links from a master modulation controller. Power for the local modulator control circuit may be obtained within the power cell from the AC power supply for that cell.

In one presently preferred embodiment, each power cell may be constructed internally to low voltage standards. By connecting multiple cells in series, it is possible to produce a low- or medium-voltage power supply with low-voltage power cells. Serial connection of the cells makes multiple voltage possible; these multiple voltage levels may be used to obtain improved waveforms.

It is also preferred to provide a method of controlling the plurality of power cells using a pulse-width modulation technique which selectively controls the duration and frequency of power cell pulse outputs. This method can use control signals, based upon interdigitated carrier signals, to selectively cause a switching event in a particular power cell. It is preferred that switching events be sequenced such that a switching event is occurring in only one power cell at a time.

Other details, objects, and advantages of the invention will become apparent as the following description of certain present preferred embodiments proceeds.

DESCRIPTION OF PREFERRED EMBODIMENTS

Figure 1:
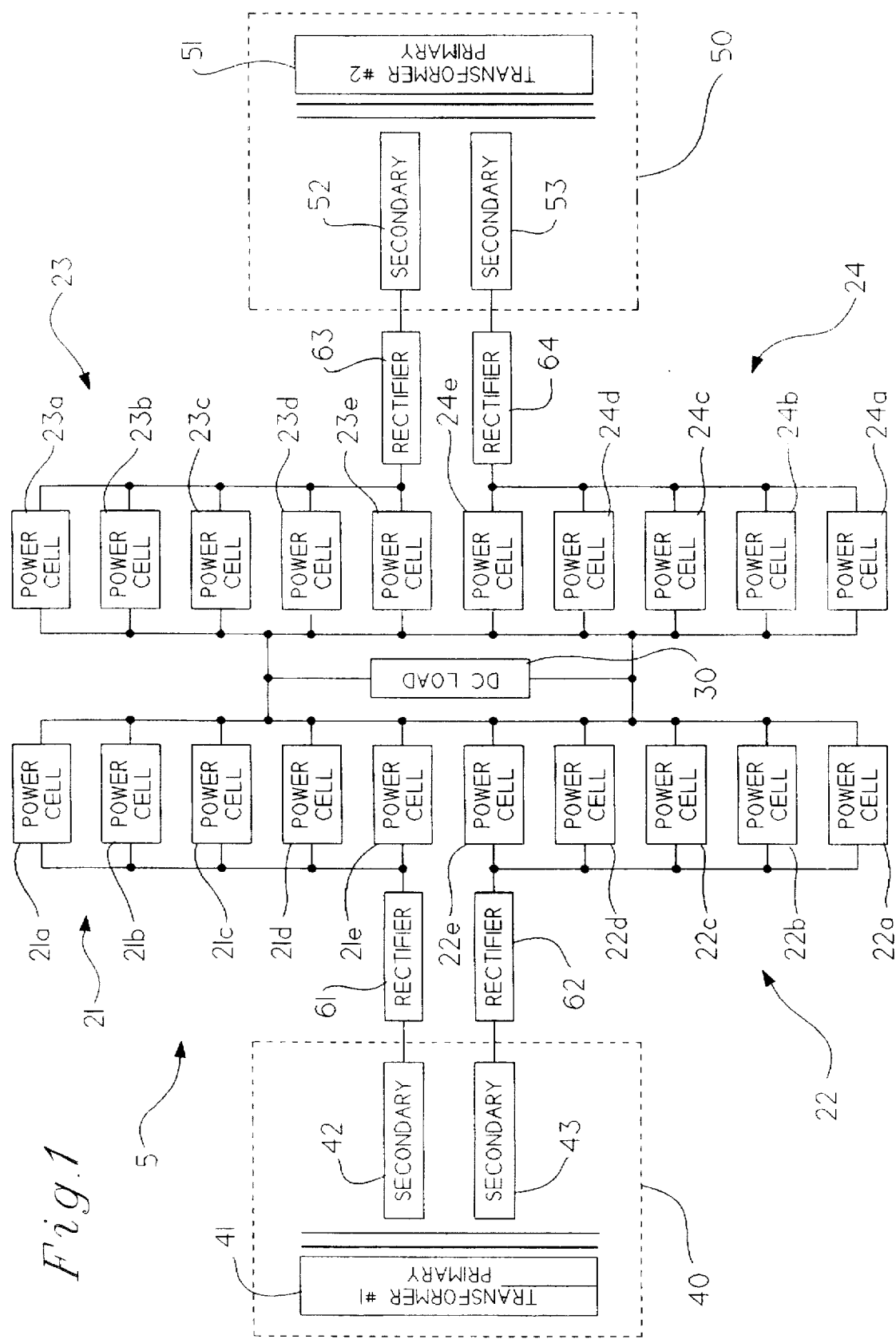
FIG. 1 illustrates a variable-voltage, variable-current power conversion apparatus employing a single power cell per parallel group.

The power converter and method herein provide controlled DC power to a wide variety of DC loads such as, for example, arc furnaces, plasma torches, electro-chemical processes, DC motors, and the like. The method and apparatus allow voltage, current, or power regulation of the load over a wide range of voltages and currents, while maintaining high input power factors, low AC input harmonic distortion, fast response, and smooth, low-ripple DC output. The invention herein does not inject significant harmonics onto the power distribution system, minimizing the need for power filters. In addition, interference, resonance problems with power factor capacitors, and power line notching are also reduced by the method and apparatus herein. Low output ripple can be supplied by phase shifting and interlocking the multiple chopper outputs relative to each other. Current-sharing is maintained by sensing and regulating the current in the various individual parallel power output lines. The high chopping frequency reduces the size of the filter/isolation output chokes. Interdigitation of the outputs can reduce net output ripple and improve response time.

In general, the AC/DC power conversion apparatus herein may receive power from commercial electric power sources which feed at least one transformer. Each transformer can have one primary, and one or more secondary windings. Mesh-connected windings may include, for example, delta or extended-delta configurations. Star-connected windings may, for example, include wye or zig-zag configurations. Primary windings may be star-connected but mesh-connected windings may be preferred. Secondary windings may be star-connected or mesh-connected, as required to provide a preselected phase shift for the respective secondary windings. Under certain circumstances, mesh windings may be manipulated to advance some of the secondary windings by preselected degrees of electrical phase, to retard some of the secondary windings by preselected degrees of electrical phase, and, perhaps, to leave other secondary windings unshifted in electrical phase.

Where more than one transformer is employed, it may be preferred to shift the electrical phase of any one primary winding relative to the electrical phase of any other primary winding. Where a single transformer having one primary winding and multiple secondary windings are employed, it may be preferred to separate in electrical phase each secondary winding from any other secondary winding. Rectification of the transformer output can be provided so that the input to each power cell is a multipulse rectified AC current. Rectification of the AC input can be accomplished by providing each power cell with a rectifier. However, it may be preferred to provide one rectifier for each transformer secondary winding. Each power cell of the power cell array can be arranged on respective power output lines. Due to the electrically parallel layout of the power output lines, the current contribution from each power output line may be summed to provide the total current demanded by the DC load. On each power output line, there are a plurality of serially-connected power cells. Depending upon the voltage and current requirements of the DC load, additional low voltage cells may be connected in series on each of the respective power output lines such that the overall layout of the power cell array consists of a plurality of power output lines connected in parallel, with each power output line having multiple, serially-connected power cells therein.

For high-current, low-voltage operation, serially-connected low voltage power cells may be connected in parallel. For clarity, only a single power cell is shown on each parallel power output line.

FIG. 1 shows 24-pulse power conversion apparatus 5 having a parallel array of 20 480 V power cells 21a–e, 22a–e, 23a–e, 24a–e, which can provide 40 KA of current to DC load 30. In this embodiment, apparatus 5 is driven by two transformers 40, 50, each having primary windings 41, 51 which can be extended-delta-configured, and which are electrically phase-shifted from each other, such as, for example, ±7.5°. Each primary transformer winding 41, 51 can have two secondary transformer windings 42, 43, 52, 53, with one secondary winding 42, 52 being delta-connected and the other secondary winding 43, 53 being wye-connected. Secondary transformer windings 42, 43, 52 and 53 can be shifted in electrical phase by about 0°, +30°, 0°, and −30°, relative to the phase of associated primary windings, 41, 51, respectively.

The alternating current from each of secondary windings 42, 43, 52, 53 is converted into DC current by rectifiers 61, 62, 63, 64. Each rectifier can be energized by a respective secondary winding and supply a plurality of power cells. For example, rectifier 61 is energized by secondary winding 42 and supplies power cells 21a–e, rectifier 62 is energized by secondary winding 43 and supplies power cells 22a–e, rectifier 63 is energized by secondary winding 52 and supplies power cells 23a–e. Rectifier 64 is energized by secondary winding 53 and supplies power cells 24a–e. Each of the twenty power cells in group 21a–e, 22a–e, 23a–e and 24a–e can be shifted in electrical phase from other cells by about 18° at the chopper operating frequency. With two power cells on each leg of groups 21, 22, 23, 24, the corresponding electrical phase shift is about nine degrees.

Each group of power cells 21a–e, 22a–e, 23a–e and 24a–e can contribute a proportional amount of the total current required by the DC load 30. In FIG. 1, each group, such as 21, can contribute 10,000 amperes (10 KA) to the total current, so that the four groups of power cells 21a–e, 22a–e, 23a–e and 24a–e, provide a total of 40 KA to DC load 30. The voltage with which the current is delivered may be varied as required by DC load 30, such as, for example, 0–325 VDC.

Figure 2:
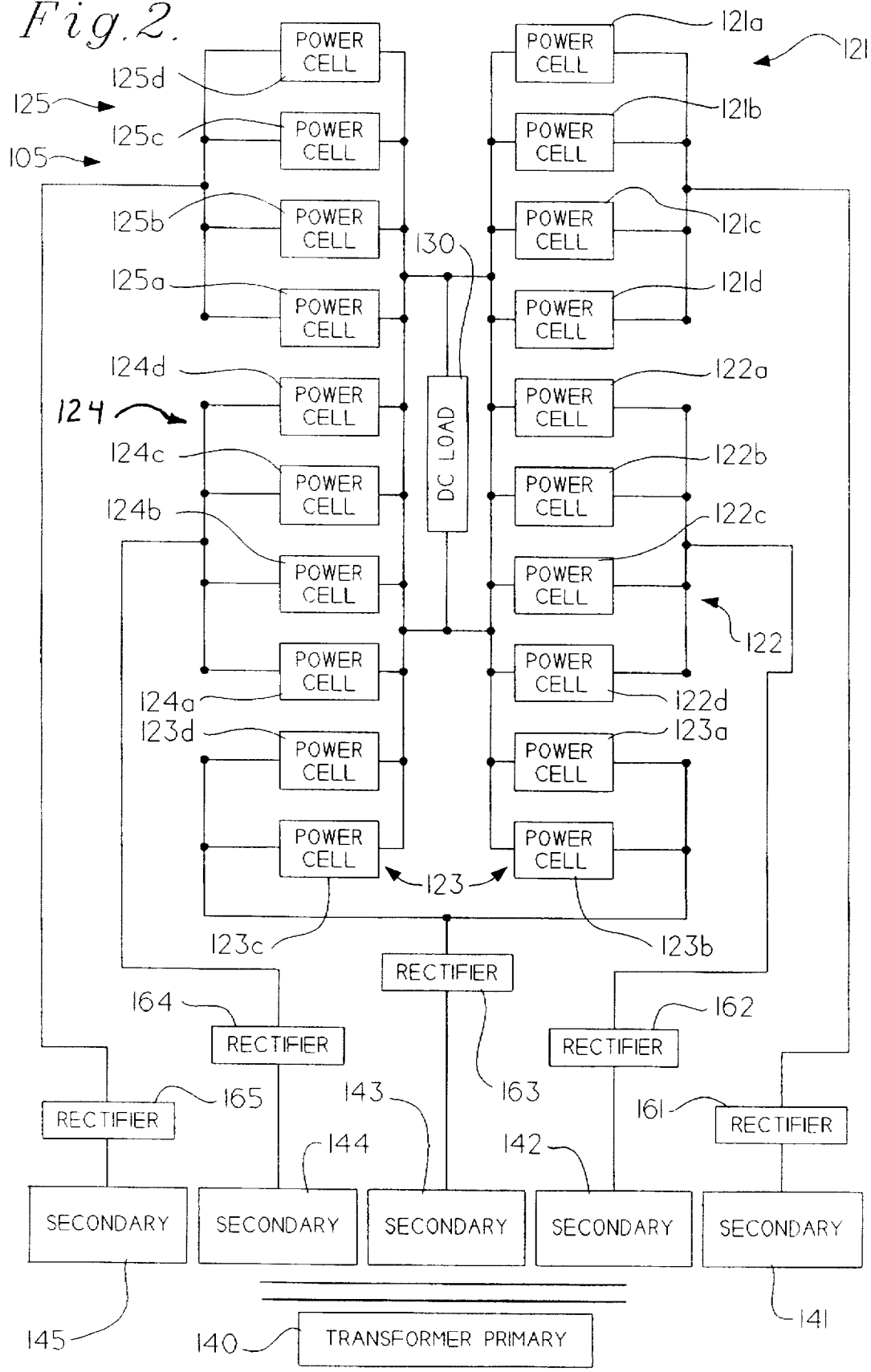
FIG. 2 shows another embodiment of a variable-voltage, variable-current power conversion apparatus employing a single power cell per parallel group.

FIG. 2 shows 30-pulse power conversion apparatus 105 having a parallel array of 20 480 V power cells 121a–d, 122a–d, 123a–d, 124a–d, 125a–d, which can provide 40 KA of current to DC load 130. In this embodiment, the apparatus is driven by one transformer primary winding 140 having a plurality of phase-shifted mesh-configured secondary windings, here five secondary windings 141, 142, 143, 144, and 145. Similar to FIG. 1, current is rectified by rectifiers 161, 162, 163, 164, 165 which can be connected with secondary windings 141, 142, 143, 144, 145, respectively. In this embodiment, each secondary winding 141, 142, 143, 144, 145 is electrically phase-shifted approximately 12° from each other secondary winding, thereby providing a 30-pulse AC input to the power cell array. Also, each of the twenty power cells in groups 121a–d, 122a–d, 123a–d and 124a–d can be shifted in electrical phase from other cells, by about 18° at the chopper operating frequency. As in FIG. 1, each group of power cells 121a–d, 122a–d, 123a–d, 124a–d, 125a–d contributes a DC current component which, when summed, provides DC load 130 with the requisite current, e.g., 40 KA, at a predetermined voltage such as, for example, 0–325 VDC.

Figure 3:
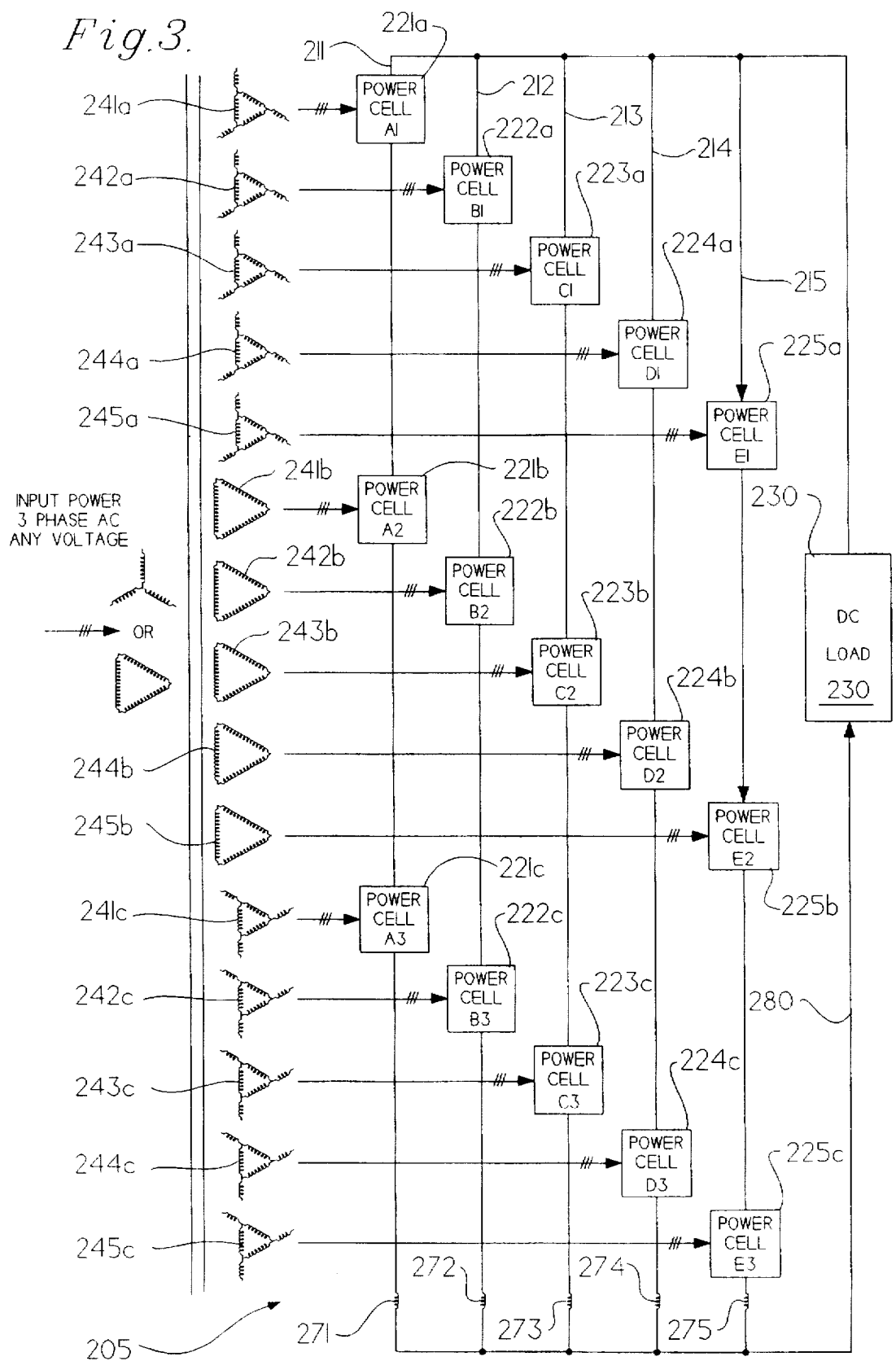
FIG. 3 illustrates a variable-voltage, variable-current power conversion apparatus using groups of power cells connected in series, with multiple groups and in parallel according to the invention herein.

FIG. 3 illustrates power conversion apparatus 205 also having power output lines 211, 212, 213, 214, 215 arranged in parallel, as in FIGS. 1 and 2. However, here serially-connected multiple power cells are shown in each parallel power output line. Multiple cells in each parallel output line make it possible to produce a medium-voltage DC power supply with a plurality of low-voltage power cells. Serial connections also can increase the number of voltage levels available from the power output line; these multiple voltage levels may be used to obtain improved current waveforms. Indeed, other circuit topologies such as those shown, for example, in FIGS. 1 and 2, may be provided with a plurality of serially-connected power cells in each of the power output lines shown therein.

Each power cell may be constructed internally to low-voltage standards, for example, each power cell may have a 600-volts rating, despite its inclusion in a medium-voltage supply. In such an embodiment, the individual power cells may be isolated from ground, and other power cells, using insulation suitable for the medium voltage level being used.

In FIG. 3, each of five parallel power output lines 211, 212, 213, 214, 215 consists of three serially-connected power cells 221a–c, 222a–c, 223a–c, 224a–c, 225a–c. In other embodiments, circuits using greater or fewer than three power cells in series may be used to satisfy the voltage requirements of DC load 230. Each of the power cells 221a–c, 222a–c, 223a–c, 224a–c, 225a–c, in a particular power output line 211, 212, 213, 214, 215, can provide preselected voltage and current increments to the total output voltage and current of apparatus 205. Each of the power cells can be supplied by separate secondary transformer windings 241a–c, 242a–c, 243a–c, 244a–c, 245a–c, which may be phase-shifted by a predetermined amount. Windings 241a–c, 242a–c, 243a–c, 244a–c, 245a–c can be phase-shifted mesh- or star-connected to lower the supply transformer's K-factor and to improve harmonics control. Such connections can include, for example, extended delta or zig-zag connections.

It may be preferred to shift the output of each power cell 221a–c, 222a–c, 223a–c, 224a–c, 225a–c, by a preselected degree of electrical phase from each other at the chopper operating frequency. In general, the respective phase shifts at the desired operating frequency may be obtained by dividing 360° by the number of single chopper power cells to be employed. For example, in FIG. 3, the power cells 221a–c, 222a–c, 223a–c, 224a–c, 225a–c is electrically phase shifted from each other by generally 24°.

To reduce the likelihood that any one parallel power output line 211, 212, 213, 214, 215, may provide a disproportionate share of load current, a current controller 271, 272, 273, 274, 275 can be employed on each parallel power output line 211, 212, 213, 214, 215. Current controller 271, 272, 273, 274, 275 can be an active or a passive controller, an example of such passive controller being a simple inductor. Alternately, current control 271, 272, 273, 274, 275 can be incorporated into the power cell 221c, 222c, 223c, 224c, 225c, electrically closest to the supply line 280 to DC load 230 on power output line 211, 212, 213, 214, 215.

Figure 4:
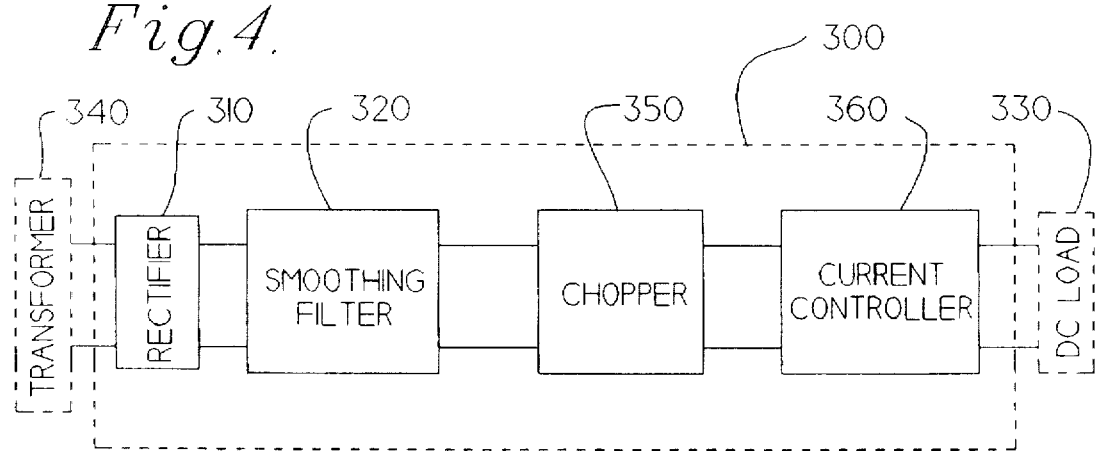
FIG. 4 illustrates a power cell for converting AC power to DC power.

FIG. 4 illustrates one embodiment of a power cell 300. Power cell 300 can be connected in series or parallel with other power cells according to the invention herein, but is illustrated without such connection to elucidate the internal topology of power cell 300. Transformer 340 provides electric power to power cell 300 which converts the AC power supplied to transformer 340 into DC power of desired voltage and current. This DC power is supplied, in turn, to DC load 330 in series with other power cells within a given power output line. Power cell 300 may include rectifier 310 therewithin. However, it may be desirable to provide the necessary rectified AC input to power cells by employing a reduced number of rectifiers external to the power cells with each rectifier supplying more than one power cell, as seen in FIGS. 1 and 2. As shown only parallel connected cells can share a common rectifier.

Rectified AC power can be provided to smoothing filter 320, which may be a passive capacitive smoothing filter. Although some ripple current may also exist in the output of smoothing filter 320, filter 320 provides a substantially DC voltage to chopper 350. Chopper 350 may include one or more semiconductor switches which are selectively operated so that electric power of a preselected voltage and preselected current may be supplied to load 330. Current controller 360 can regulate the current transmitted from power cell 300 to load 330. In addition, current controller 360 can operate in conjunction with chopper 350, with current controllers in other power cells, or both, to regulate the amount of current flowing through each individual power output line so that current flow is generally equally distributed among each of the power output lines. Current controller 360 may be a passive inductor device and may include a current sensor for detecting the magnitude of the current flowing through the respective power output line.

Figure 5:
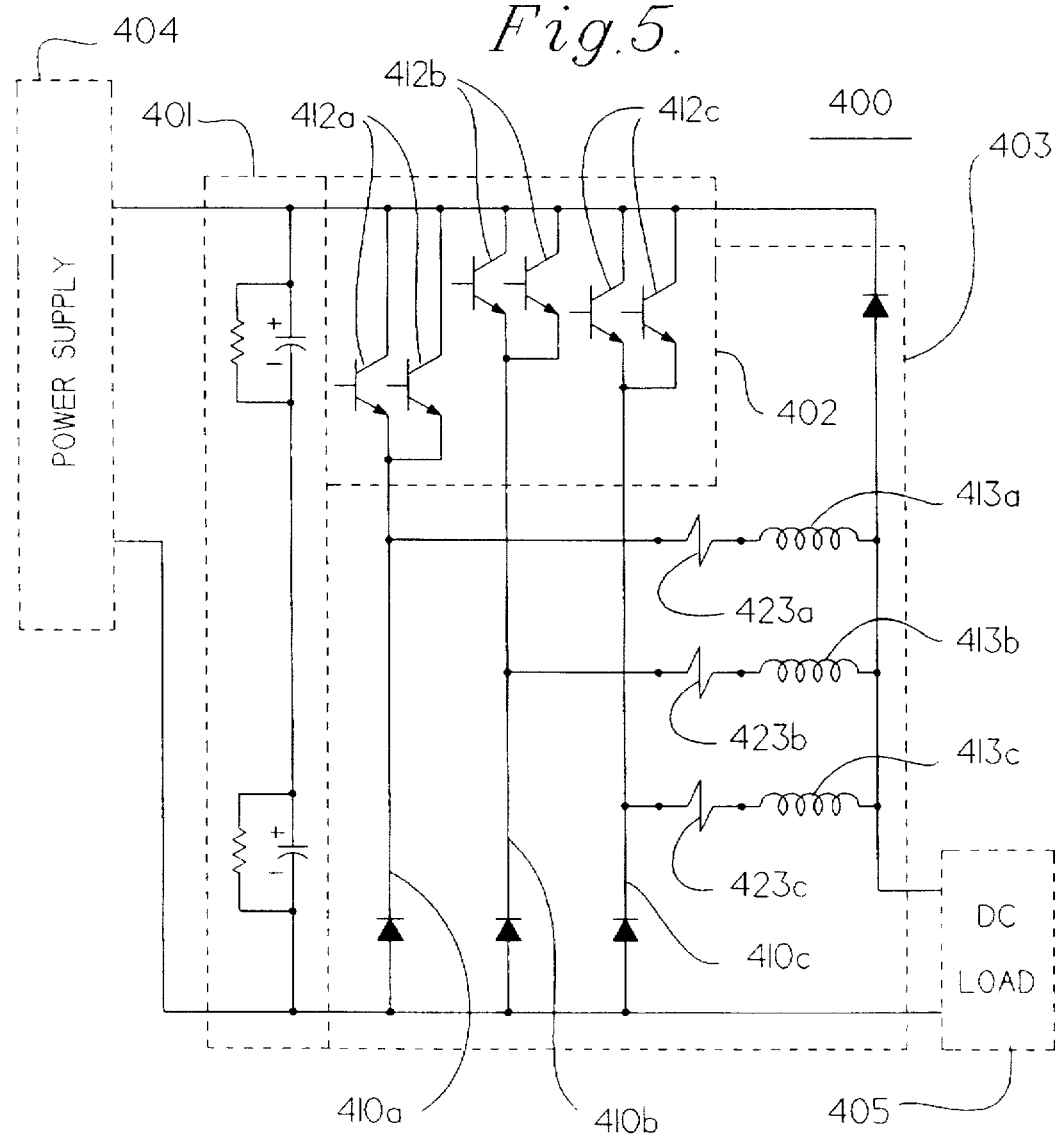
FIG. 5 is a schematic diagram of an embodiment of a three-channel power cell which can be series or parallel-connected according to the invention herein.

FIG. 5 illustrates a three-channel power cell 400 having smoothing filter 401, chopper 402, and current controller 403. Rectification of AC power input is provided externally to power cell 400, as is seen in FIGS. 1 and 2. In this case, power supply 404 can include a transformer and a rectifier.

Smoothing filter 401 receives rectified power from power supply 404 and converts the pulsating power to a smooth DC voltage. In this embodiment, smoothing primarily is effected by passive resistive-capacitive components in filter 401; however, smoothing may also be provided by active or non-capacitive elements, or both. Chopper 402 may include one or more channels, with each channel having at least one semiconductor switch which can be power transistors such as, for example, bipolar transistors or insulated-gate bipolar transistors (IGBT). In this embodiment, three channels 410a, 410b, 410c are used, with each of the three channels 410a, 410b, 410c having two semiconductor switches 412a, 412b, 412c, respectively. Switches 412a, 412b, 412c can be selectively operated so that a preselected portion of the smoothed power input waveform is passed through to power cell channels 410a, 410b, 410c. In general, switches 412a, 412b, 412c are operated at a predetermined carrier frequency such as, for example, 1 kHz. In this embodiment, the carrier waveform for any one of switches 412a, 412b, 412c can be interdigitated, i.e., phase-shifted, with respect to the carrier waveform of any other of switches 412a, 412b, 412c such that the output of power cell 400 to load 405 has a ripple frequency of three times the carrier frequency, i.e., 3 kHz. The desired portion of the input power waveform can be selectively passed through load 405 by modulating switching information onto the carrier waveforms in series with other power cells within a given power output line. In this embodiment, switching information is modulated into the output using pulse-width modulation (PWM) techniques. With PWM, the conduction time of switches 412a, 412b, 412c can be individually adjusted to provide preselected voltage and current amplitudes in the output of power cell 400.

Imbalanced load sharing may produce undesirable effects on power cell 400. Therefore, current controller 403 can provide load sharing by each of channels 410a, 410b, 410c. In addition, current controller 403 can be operated in conjunction with the current controller of other power cells with which power cell 400 may operate in parallel, thereby balancing the load among the active power cells. Current regulation may be effected by chokes 413a, 413b, 413c which can be provided on each of respective channels 410a, 410b, 410c. In general, the inductance values of chokes 413a, 413b, 413c may be selected to facilitate current sharing on each of channels 410a, 410b, 410c, for a given range of load current frequencies; these values are approximately equal. However, it may be desired to provide a more precise degree of load sharing to each of channels 410a, 410b, 410c. Current sensors 423a, 423b, 423c can be used to sense the magnitude of the current flowing in any of channels 410a, 410b, 410c and to initiate an adjustment of the conduction times of switches 412a, 412b, 412c, thereby regulating the current passing through any one of channels 410a, 410b, 410c with respect to any other channel. Current sensors 423a, 423b, 423c may employ direct current sensing, such as a shunt-type sensor or an indirect current sensor, such as Hall-effect sensor.

Figure 6:
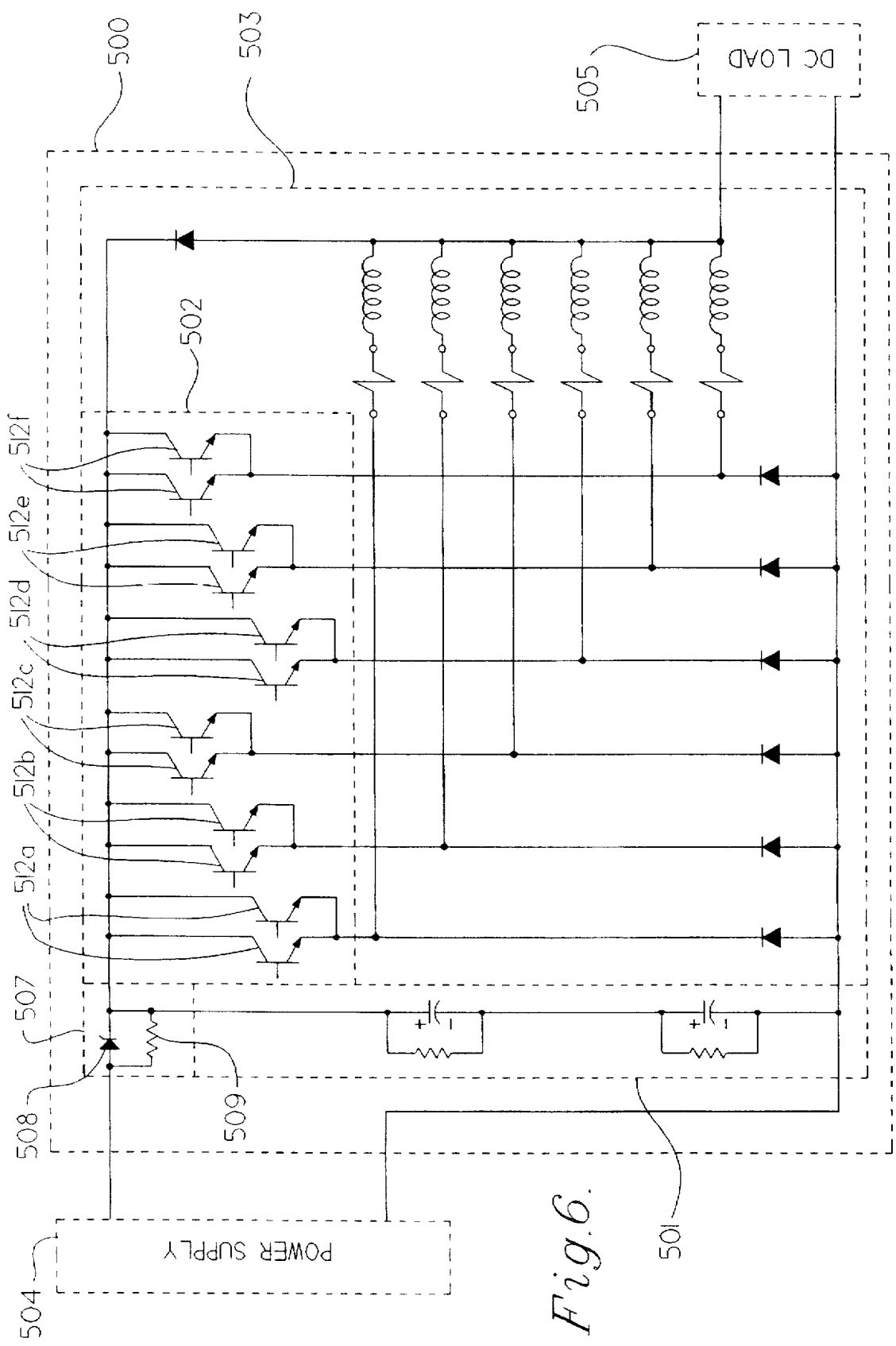
FIG. 6 is a schematic diagram of an embodiment of a six-channel power cell which can be series or parallel-connected according to the invention herein.

In FIG. 6, a six-channel power cell 500 is shown. Similar to FIGS. 4 and 5, FIG. 6 can be connected in parallel with other power cells but is presented alone to elucidate power cell 500 topology. Similar to FIG. 5, FIG. 6 employs smoothing filter 501, chopper 502 and current controller 503. Filter 501 may employ active smoothing; passive components may also be used for filter 501 such as, for example, the resistive-capacitive components illustrated in filter 501. Analogous to FIG. 5, the carrier waveforms for each of switches 512a–512f can be interdigitated such that the current output of power cell 500 to DC load 505 is six times the carrier frequency, for example 6 kHz.

When initially activated, power cell 500 may draw substantial amounts of current from the rectifier in power supply 504. In-rush current limiter 507 may be used to limit the initial amount of current drawn by power cell 500. With thyrister 508 initially off, current is limited to that admitted through the resistor 509. Once the capacitors in smoothing filter 501 are fully charged, thyrister 508 turns on and power cell 500 may be operated under load. However, it may be preferred to use the impedance value inherent in the transformer secondary windings to limit start-up in-rush current, in place of current limiter 507.

Figure 7:
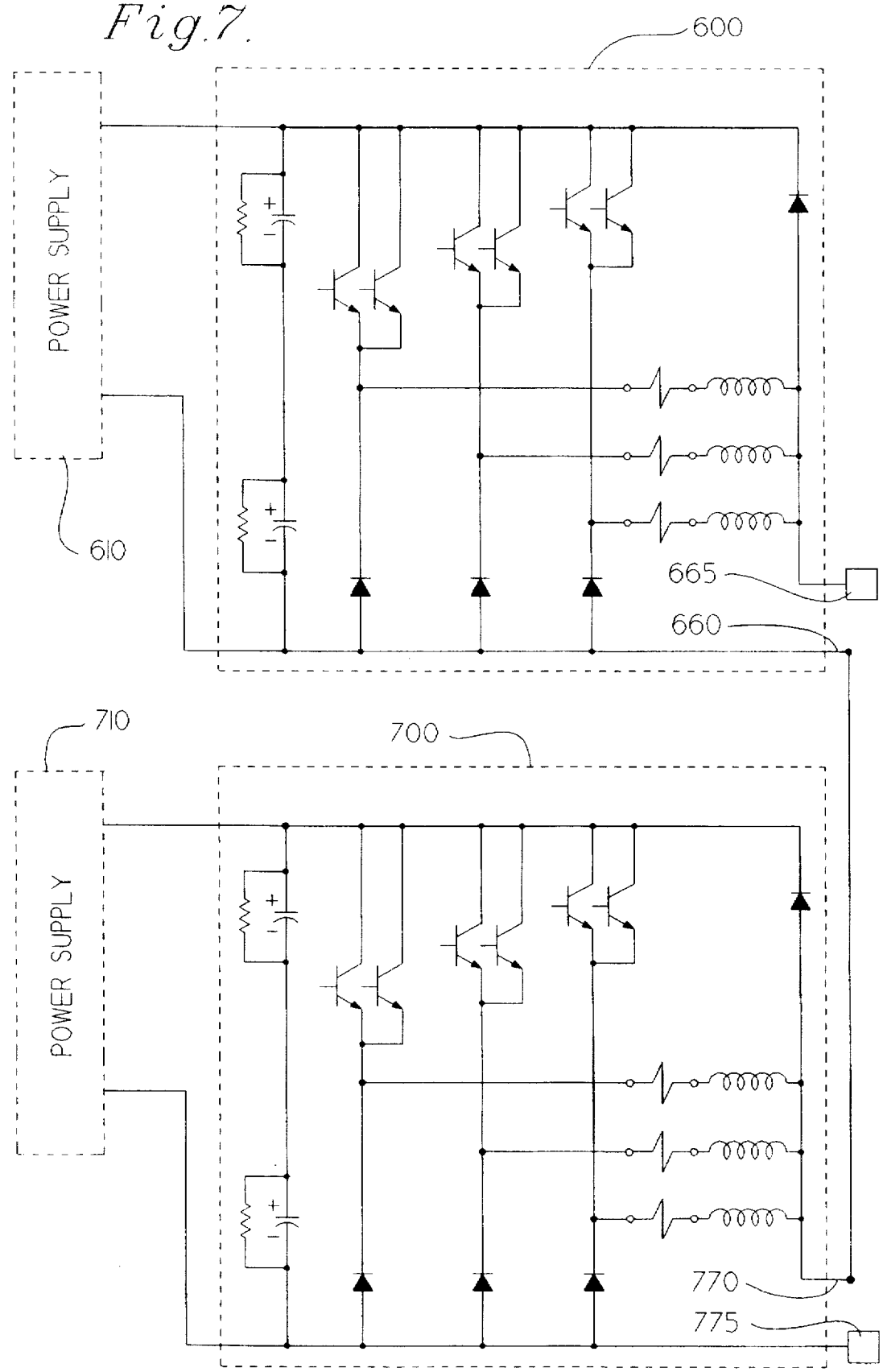
FIG. 7 is a schematic diagram of an embodiment of a two-cell series-connected according to the invention herein.

FIG. 7 illustrates two series-connected power cells 600, 700 which can receive input power from two separate power supplies 610, 710, which power supplies 610, 710 must have separate transformer windings. Each power cell 600, 700 may have a topology similar to power cell 400 of FIG. 5. By connecting the common return line 660 of power cell 600 to the power output line 770 of power cell 700, the total voltage produced by the series-connected cells 600, 700 across terminals 665, 765 may be approximately twice the total voltage of a single power cell. Similarly, additional power cells may be serially-connected to power cells 600, 700 to provide additional increments to the resultant total output voltage of a power output line, so that the total output voltage may be much greater than the maximum voltage rating for an individual power cell.

Figure 8:
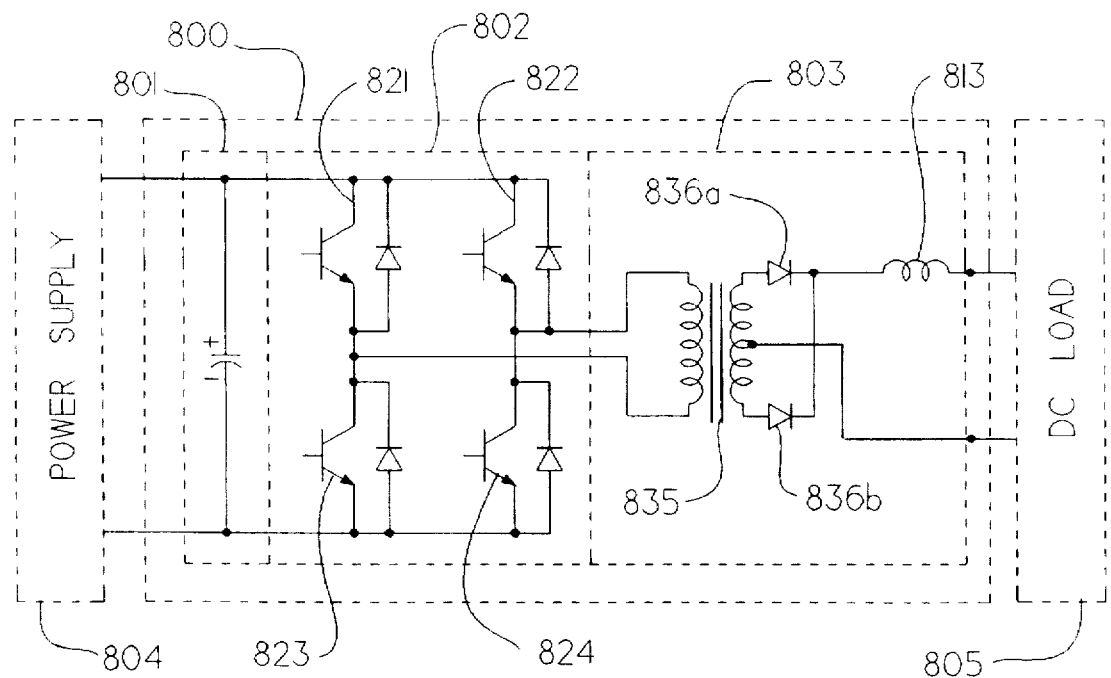
FIG. 8 is an illustration of a power cell suited for low-voltage, high-current applications which can be series or parallel-connected according to the invention herein.

Low-voltage, high-current applications may also employ a power cell in which a high-frequency step-down transformer is included in the current controller, as seen in FIG. 8. Power cell 800 can be provided rectified AC power from external power source 804. Similar to FIGS. 4, 5, and 6, power cell 800 can be connected in series parallel with other power cells on a given power output line. Smoothing filter 801 may consist of passive capacitive elements, but may include active or non-capacitive elements, or both. Chopper 802 may include an H-bridge of semiconductor switches 821, 822, 823, 824.

It can be seen in FIG. 8 that transistors 821 through 824 are connected in a single H-bridge configuration. To form the H-bridge configuration, it is preferred to connect the emitter of transistor 821 to the collector of transistor 823. Similarly, the emitter of transistor 822 is connected to the collector of transistor 824. Transistor pairs 821, 823 and 822, 824 are each connected to smoothing filter 801, with the collectors of transistors 821, 822 being connected with the positive side and the emitters of transistors 823, 824 being connected to the negative side of filter 801.

Figure 9A:
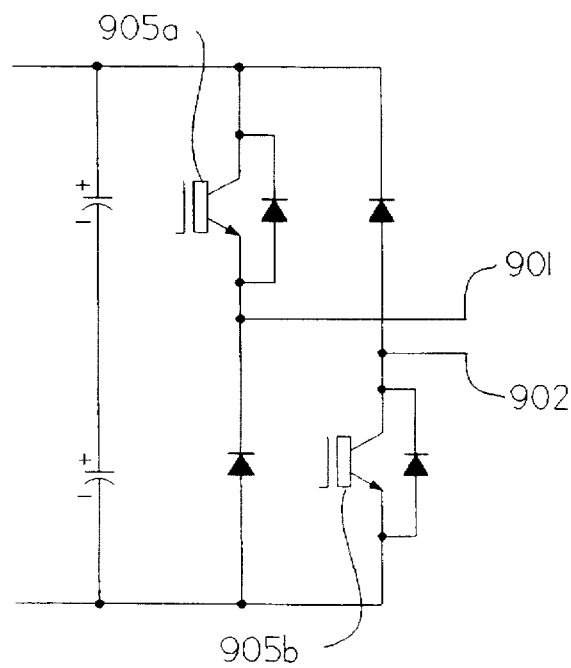
FIG. 9a illustrates a chopper suited for two-quadrant operation.
Figure 9B:
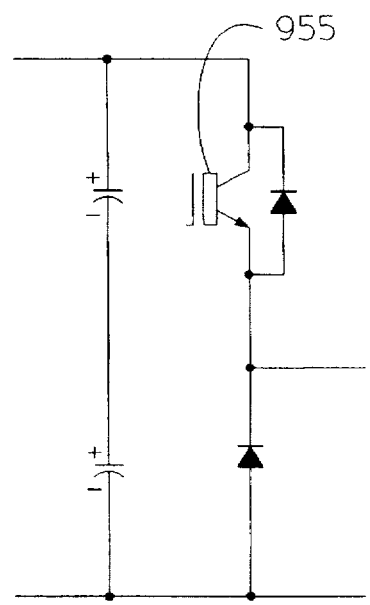
FIG. 9b illustrates a chopper suited for single polarity current and voltage applications.

Unlike the current controllers in FIGS. 5–7, current controller 803 includes a high-frequency transformer 835 which steps-down the chopper output voltage and increases chopper output current, by a predetermined ratio. In this way, the current required to be carried by chopper 802 and, concomitantly, the size of the H-bridge transistors, 821, 822, 823, 824 can be reduced while maintaining a high current flow to load 805. Because the output of transformer 835 is substantially alternating current, rectifiers 836a, 836b may be provided to provide a primarily DC current and voltage output to load 805. Also, current controller 803 can consist of a passive inductive device 813, as is illustrated here, or may include additional active current control as described in FIG. 4.

Where the DC load only requires two-quadrant operation, the chopper configuration in FIG. 9a employs two transistors 905a, 905b which can constrain current flow to enter terminal 901 and leave terminal 902 while permitting voltage to be positive or negative. In addition, where only a single polarity current and voltage is required, it may be desirable to employ a chopper using only a single-transistor 955 per channel, as shown in FIG. 9b.

Figure 10:
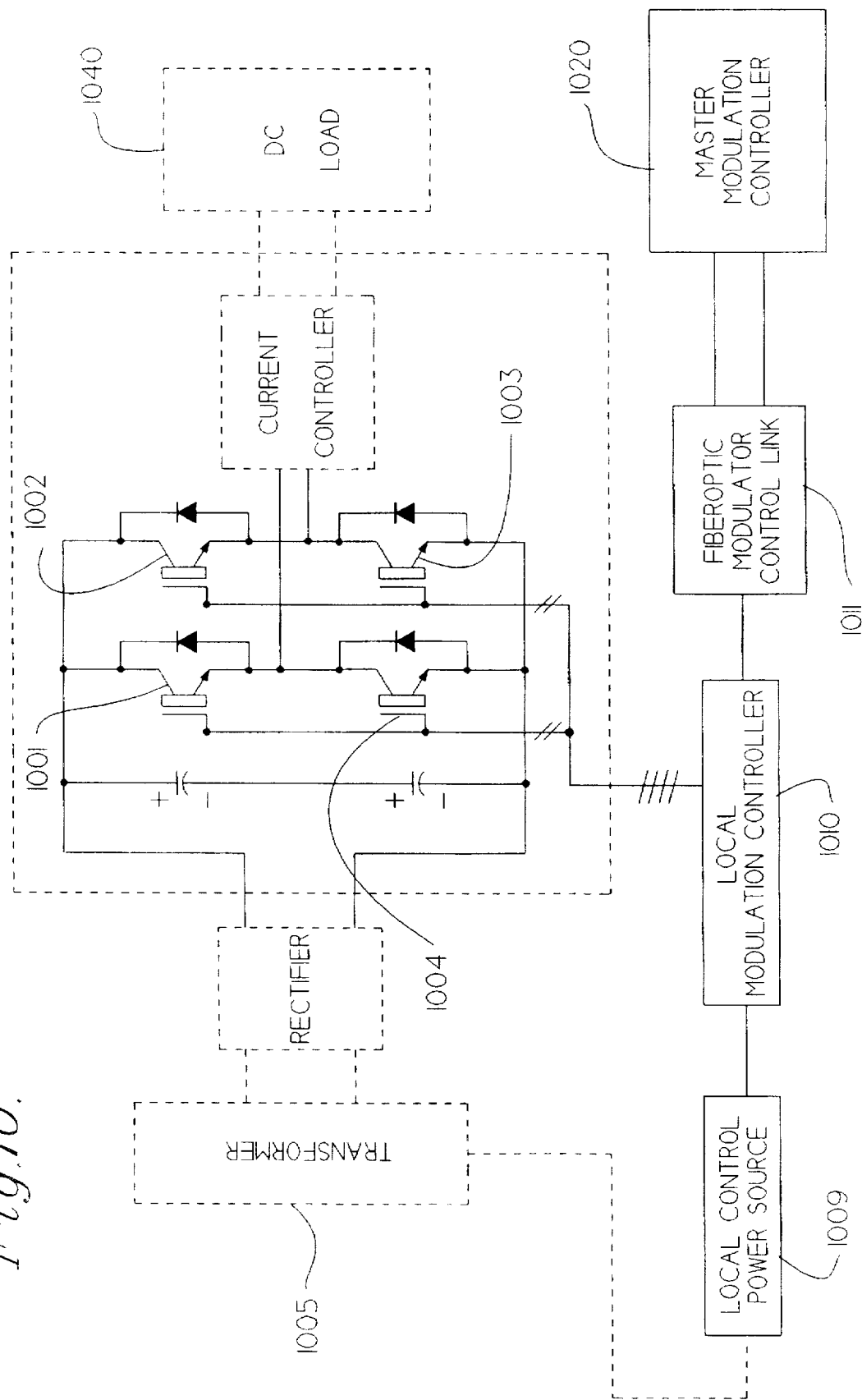
FIG. 10 is a schematic diagram of a power cell including an illustration of a modulation control scheme using fiber-optic links according to the present invention.
Figure 11:
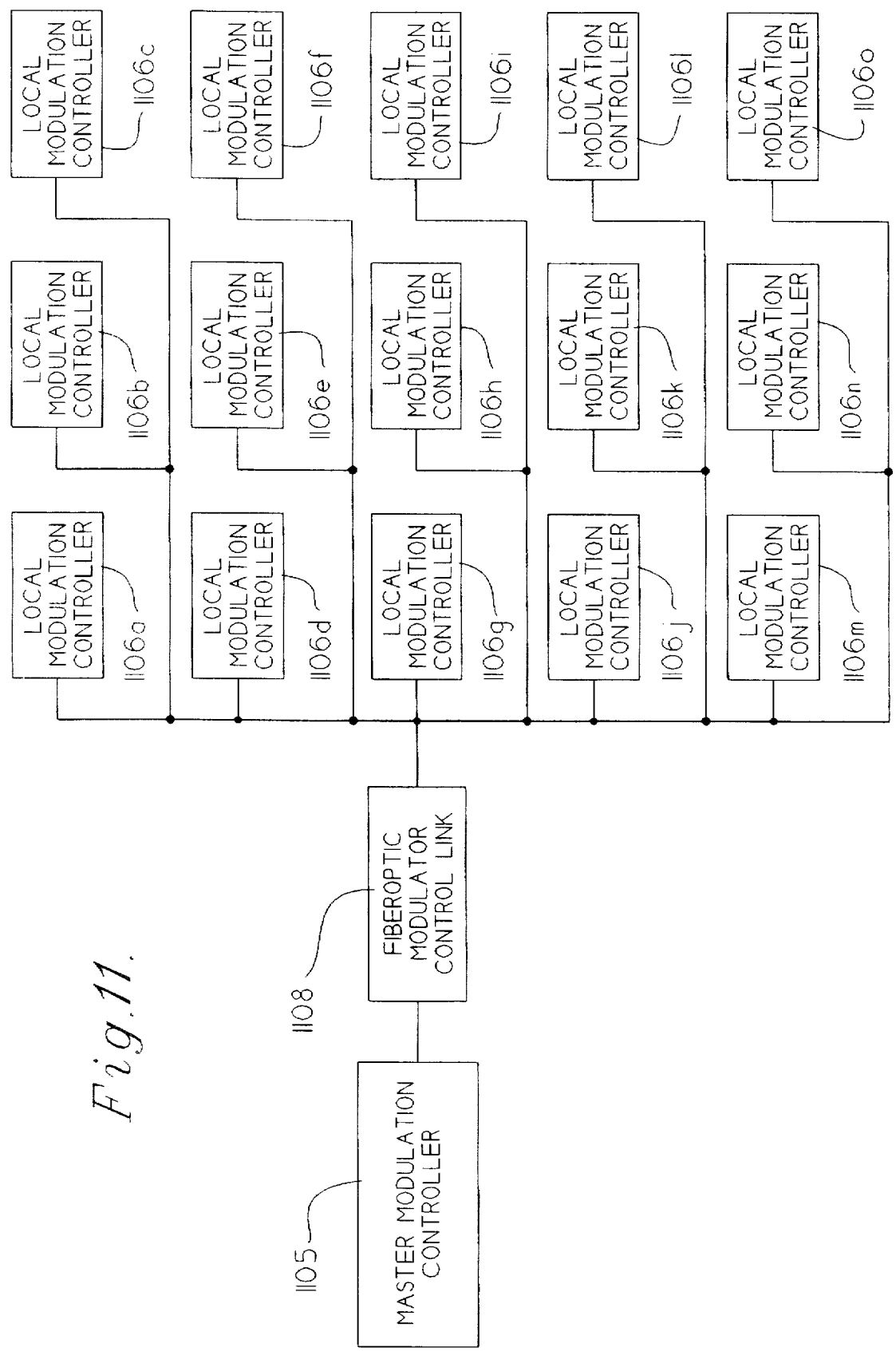
FIG. 11 is a diagram of an overall plan of distributed modulation control.

Each semiconductor switch shown in FIGS. 5–9 can be controlled through the operation of modulation control means which may include a distributed control architecture employing the coordinated operation of local and master modulation controllers, as shown in FIGS. 10 and 11. Such coordinated operation can require means for selectively controlling the switching events within each of the power cells so that each switching event is temporarily separate from other switching events. Such temporal separation can be provided by interdigitating the carrier signals upon which switching information has been modulated. The modulation control means may also include means for selectively applying a control signal to respective power cells so that each power cell conducts current at a predetermined voltage, with a predetermined polarity, and for a predetermined duration.

In FIG. 10, transistors 1001 through 1004 can receive controlling signals from local modulation controller 1010 through suitable isolation means. The single H-bridge of FIG. 10 is similar to the single H-bridge configuration of FIG. 8. Controller 1010 may be typified by Fuji part number EXP841, although other gating controllers may be used. Isolation may be provided by fiber-optic means, including fiber-optic modulator control link 1011. Controller 1010 selects the respective transistors to be ON, which will permit power to pass to a load 1040. Fiber-optic modulator control link 1011 can be used to electrically isolate all circuits in any one cell from all circuits in any other cell, and to reduce electromagnetic interference effects which may be imposed between local modulation controller 1010 and master modulation controller 1020. Local modulation controller 1010 can receive power from local control power source 1009 which may be electrically connected to secondary winding circuit input 1005.

In FIG. 11, master modulation controller 1105 can be seen to transmit modulation control signals to, and accept control information from, local modulation controllers 1106a through 1106o. As shown in FIG. 10, where local controller 1010 may be like one of controllers 1106a through 1106o of FIG. 11, and master controller 1105 of FIG. 10 can be like master controller 1105 of FIG. 11, control signals in FIG. 11 can be bidirectionally transmitted by way of fiber-optic modulator control link 1108. Link 1108 in FIG. 11 may be similar to link 1011 in FIG. 10.

Figure 12:
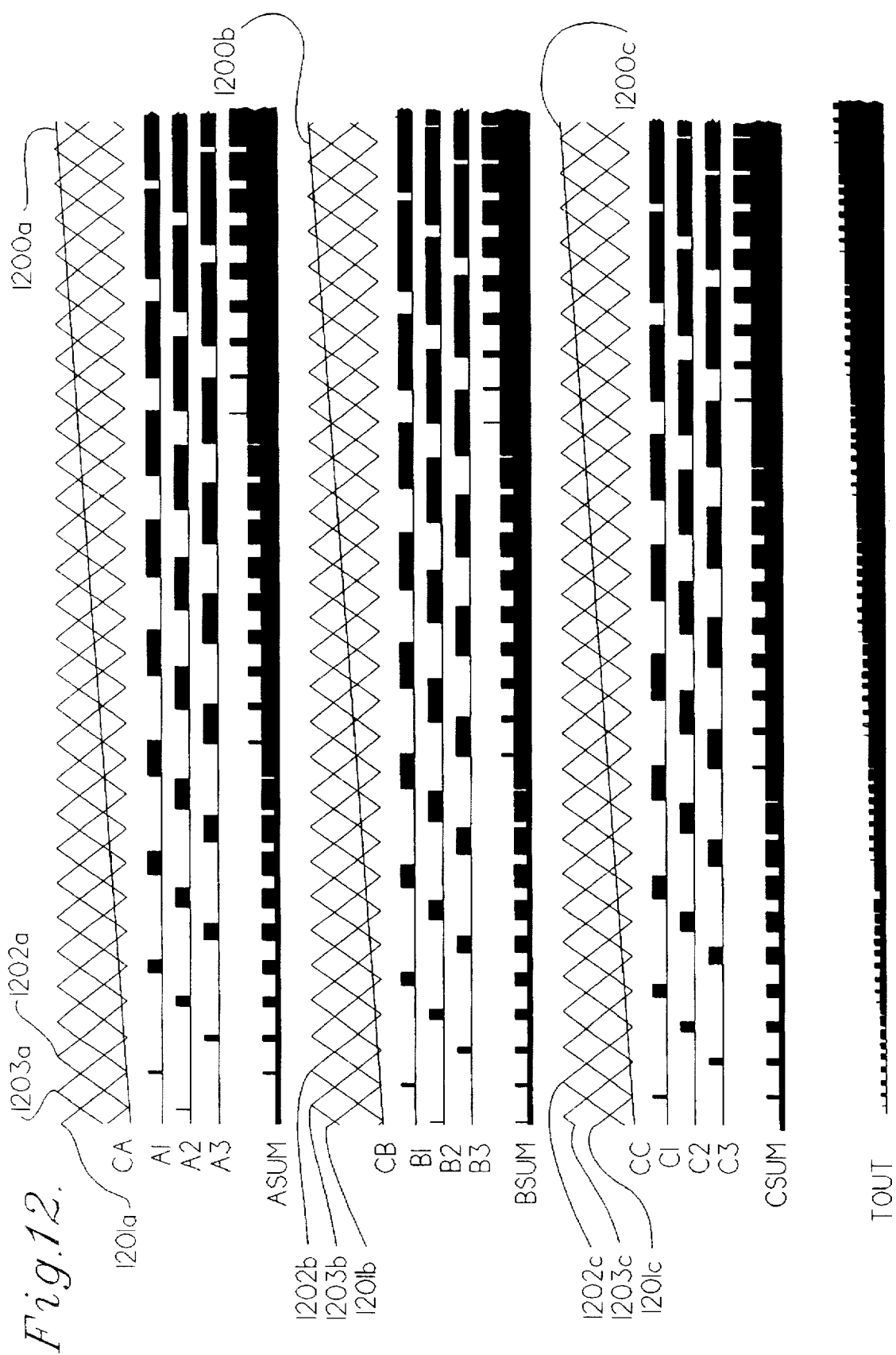
FIG. 12 is an illustration of control and carrier waveforms which may be used to produce a DC power supply.

FIG. 12 shows one possible way of controlling the AC/DC power conversion apparatus herein, based on the "Subharmonic Method". In general, a control signal can be generated for each power output line, and a carrier signal such as, for example, a triangular signal, can be generated for each power cell. In the architecture of this example, each power output line, A, B, C, has three serially-connected power cells, for example, A1, A2, A3. The output of each power cell can be summed to produce a composite power output line signal, for example, ASUM. In addition, the composite power output line signals ASUM, BSUM, CSUM, for each of power output lines A, B, C, respectively, can be summed to produce a composite total output signal, TOUT, which can be supplied to the load. In FIG. 12, CA, 1200a, is the control signal for power output line A. CA, 1200a, is compared with three triangular carrier signals, 1201a, 1202a, 1203a, each oscillating at the preselected switching frequency such as, for example, 1 kHz. For clarity, FIG. 12 shows control signals 1200a, 1200b, 1200c which are monotonically increasing and producing monotonically increasing outputs for each power output line, and, ultimately, the total output to the load.

Each carrier signal within each power supply cell is phase-shifted from other carrier signals within the same power cell by about 120°. In addition, the carrier signals of any one power cell are phased-shifted by about 40° from the carrier signals in any other power cell in that respective power output line. Carrier signals 1201a–1203a, 1201b–1203b, 1201c–1203c are identical except for successive phase shifts, described above.

Whenever CA 1200a is greater than carrier 1201a, the signal A1 is high; otherwise A1 is low. A1 is used to control the transistors in power cell A1. Similarly, when control signal CA, 1200a is greater than carrier signal 1202a, signal A2 is high; otherwise A2 is low. A2 is used to control the transistors in power cell A2. In similar fashion, whenever CA, 1200a is greater than carrier 1203a, signal A3 is high; otherwise A3 is low. A3 is used to control the transistors in power cell A3. The summation of the output of power cells A1, A2 and A3 provide composite power output line signal ASUM. In the same way, control signal CB, 1200b, can be selectively varied, in conjunction with carrier signals 1201b, 1202b, 1203b to produce power cell signals B1, B2, B3 which result in composite power output line signal BSUM. Similarly, control signal CC, 1200c, can be adjusted in conjunction with carrier signals 1201c, 1202c, 1203c, to produce composite power output line signal CSUM. By using separate carriers to create control signals for individual cells, the instants during which cell switching events occur can be controlled. Cell switching events can be temporally separate, i.e., dispersed in time, using pulse interdigitation, to avoid simultaneous switching events by more than one cell. Pulse interdigitation causes the apparent switching frequency to the load to be higher than the actual switching frequency of the cells. In addition, where high-frequency carrier signals are used to control the switching events, the output to the DC load can appear to the load to be an essentially DC input with a low magnitude, high frequency ripple component.

While specific embodiments of, and methods for practicing, the invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the invention which is to be given the full breadth of the following claims and any and all embodiments thereof.

We claim:

1. A power converter for use with a DC load comprising:
   (a) a multi-phase power transformer, said power transformer having at least one primary winding circuit and a plurality of secondary winding circuits, said at least one primary winding circuit being electrically connectable to a source of multi-phase AC power;
   (b) a plurality of power cells, each of said plurality of power cells having an input connected with one of said plurality of secondary winding circuits, each of said plurality of power cells having a controllable output to such DC load, and respective ones of said plurality of power cells being electrically connectable with the common line of such DC load;
   (c) modulation control means connected with respective ones of said plurality of power cells, so that the voltage of said respective ones of said plurality of power cells may be controlled, said modulator control means further including means for selectively controlling a switching event of each of said plurality of power cells so that said switching event of respective one of said plurality of power cells is spaced in time from said switching event of respective others of said plurality of power cells to produce a smooth DC output; and
   (d) each of said plurality of power cells having:
     (i) a rectifier electrically connected with a respective one of said plurality of secondary winding circuits and having an electrical output;
     (ii) a smoothing filter having an electrical output, said smoothing filter being connected with said electrical output of said rectifier;

(iii) a chopper having an output, said chopper being connected with said smoothing filter; and (iv) a current controller having an output, said current controller being connected with said output of said chopper, said output of said current controller being connected with respective one of said power output lines to such DC load.

2. The power converter of claim 1 further comprising at least one rectifier electrically connected between a respective one of said plurality of secondary winding circuits and a second plurality of power cells, and said at least one rectifier having an electrical output.

3. The power converter of claim 1 wherein said at least one rectifier includes a diode bridge, and said smoothing filter includes capacitors.

4. The power converter of claim 1 wherein the maximum output voltage of each of said plurality of power cells is less than the maximum line-to-common voltage for such DC load.

5. The power converter of claim 1 wherein said plurality of secondary winding circuits are star-connected.

6. The power converter of claim 5 wherein at least three of said plurality of secondary winding circuits are wye windings.

7. The power converter of claim 5 wherein at least three of said plurality of secondary winding circuits are zig-zag windings.

8. The power converter of claim 1 wherein said plurality of secondary winding circuits are mesh-connected.

9. The power converter of claim 8 wherein at least three of said plurality of secondary winding circuits are delta windings.

10. The power converter of claim 8 wherein at least three of said plurality of secondary winding circuits are extended delta windings.

11. The power converter of claim 1 wherein said modulation control means further comprises (a) a plurality of local modulator controllers connected to respective ones of said plurality of power cells; and (b) a master modulator controller operably connected to each of said plurality of local modulator controllers.

12. The power converter of claim 11 wherein said master modulator controller is operably connected to said plurality of local modulator controllers with fiber-optic means.

13. The power converter of claim 1 wherein said plurality of power cells includes a pre-selected number of power cells in series in each of said power output lines, and said plurality of secondary winding circuits are spaced apart in electrical phase by a number of degrees equal to 60 divided by the total number of said power cells.

14. The power converter of claim 13 wherein said preselected number of said plurality of power cells in each of said power output lines is three, said preselected number of said power output lines is four, said total number of power cells is twelve, and respective one of said plurality of secondary winding circuits is advanced in phase by generally 5 degrees from respective others of said plurality of secondary winding circuits.

15. The power converter of claim 13 wherein said preselected number of said plurality of power cells in each power output line is two, said preselected number of said power output lines is twenty, said total number of power cells is forty, and respective one of said plurality of secondary winding circuits is advanced in phase by generally nine degrees from respective others of said plurality of secondary winding circuits.

16. The power converter of claim 13 wherein said preselected number of said plurality of power cells in each said power output line is three, said preselected number of said power output lines is five, said total number of power cells is fifteen, and respective one of said plurality of secondary winding circuits is advanced in phase by generally twenty-four degrees from respective others of said plurality of secondary winding circuits.

17. The power converter of claim 1 wherein said modulation control means further comprises:

(a) means for selectively applying at least one control signal to said plurality of power cells so that each of said plurality of said power cells conducts a current at a predetermined voltage, with a predetermined polarity, and for a predetermined duration; and (b) means for interdigitating a preselected number of carrier signals to each of said plurality of said power cells, so that harmonic components in a power frequency spectrum are generally attenuated.

18. The power converter of claim 1 wherein said rectifier includes a diode bridge, and said smoothing filter includes capacitors.

19. The power converter of claim 1 wherein said chopper further comprises at least one semiconductor switch, each of said at least one semiconductor switch operably connected to said rectifier and said smoothing filter, and each of said at least one semiconductor switch being connected to said control circuit.

20. The power converter of claim 19 wherein said semiconductor switches are power transistors.

21. The power converter of claim 1 wherein said chopper further comprises at least one semiconductor switch, each of said at least one semiconductor switch operably connected to said rectifier and said smoothing filter, and each of said at least one semiconductor switch being connected to said control circuit.

22. The power converter of claim 21 wherein said semiconductor switches are power transistors.

23. A power converter for use with a DC load comprising:

a multi-phase power transformer, said power transformer having at least one primary winding circuit and a plurality of secondary winding circuits, said primary winding circuit being electrically connectable to a source of multi-phase AC power;

(b) a plurality of power cells, each of said plurality of power cells having an input connected with a respective one of said plurality of secondary winding circuits, each of said plurality of power cells having a controllable output to such DC load, respective ones of said plurality of power cells being serially-connected with respective others of said power cells in each power output line to such DC load, and respective ones of said plurality of power cells being electrically connectable with the common line of such DC load;

(c) each of said plurality of power cells having
i. a rectifier connected to one of said secondary windings,
ii a smoothing filter connected to said electrical output of said rectifier, and
iii a chopper connected to said smoothing filter, and the output of said chopper connected to respective one of said power output lines of such DC load;

(d) modulation control means connected to each of said chopper, so that the output of said chopper may be controlled, said control means having
i. a plurality of local modulator controllers connected to respective ones of said plurality of power cells, and
ii. a master modulator controller operably connected to each of said plurality of local modulator controllers; and (e) said modulation control means further having means for selectively controlling a switching event of each of said plurality of power cells so that said switching event of respective one of said plurality of power cells is spaced in time from said switching event of respective others of said plurality of power cells to produce a smooth DC output.

24. The power converter of claim 23 wherein each of said plurality of power cells further comprises a rectifier electrically connected to a respective one of said plurality of secondary winding circuits and said rectifier having an electrical output.

25. The power converter of claim 24 wherein said rectifier includes a diode bridge, and said smoothing filter includes capacitors.

26. The power converter of claim 23 wherein the maximum output voltage of each of said plurality of power cells is less than the maximum line-to-common voltage for such DC load.

27. The power converter of claim 23 wherein said plurality of secondary winding circuits are star-connected.

28. The power of claim 27 wherein at least three of said plurality of secondary winding circuits are wye windings.

29. The power converter of claim 27 wherein at least three of said plurality of secondary winding circuits are zig-zag windings.

30. The power converter of claim 23 wherein at least three of said plurality of secondary winding circuits are mesh-connected.

31. The power converter of claim 30 wherein at least three of said plurality of secondary wing circuits are delta windings.

32. The power converter of claim 30 wherein at least three of said plurality of secondary winding circuits are extending delta windings.

33. The power converter of claim 23 wherein said master modulator controller is operably connector to said plurality of local modulator contollers with fiber-optic means.

34. The power converter of claim 23 wherein said plurality of power cells includes a pre-selected number of power cells in series in each power output line, and said plurality of secondary winding circuits are spaced apart in electrical phase by a number of degrees equal to 60 divided by the total number of said power cells.

35. The power of converter of claim 34 wherein said preselected number of said plurality of power cells in each of said power output lines is three, said preselected number of said power output lines is four, said total number of power cells is twelve and respective one of said plurality of secondary winding circuits is advanced in phase by generally thirty degrees from respective others of said plurality of secondary winding circuits.

36. The power converter of claim 34 wherein said preselected number of said plurality of power cells in each of said power output lines is two, said preselected number of said power output lines is twenty, said total number of power cells is forty, and respective one of said plurality of secondary winding circuits is advanced in phase by generally nine degrees from respective others of said plurality of secondary winding circuits.

37. The power converter of claim 34 wherein said preselected number of said plurality of power cells in each of said power output line is three, said preselected number of said power output lines is five, said total number of power cells is fifteen, and respective one of said plurality of secondary winding circuits is advanced in phase by generally twenty-four degrees from respective others of said plurality of secondary winding circuits.

38. The power converter of claim 23 wherein said chopper further comprises at least one semiconductor switch, each of said at least one semiconductor switch operably connected to said rectifier and said smoothing filter, end each of said at least one semiconductor switch being connected to said control circuit.

39. The power converter of claim 38 wherein said at least one semiconductor switch is a power transistor.

40. The power converter of claim 23 wherein said modulation control means further comprises:
  (a) means for selectively applying at least one control signal to said plurality of power cells so that each of said plurality of said power cells conducts a current at a predetermined voltage, with a predetermined polarity, and for a predetermined duration; and
  (b) means for interdigitating a preselected number of carrier signals to each of said plurality of said power cells, so that harmonic components in a power frequency spectrum are generally attenuated.

41. A method of controlling DC power to a DC load comprising:
  (a) transforming an input voltage to a plurality of secondary voltage sources;
  (b) supplying power to said DC load from a plurality of power cells fed from said plurality of secondary voltage sources;
  (c) applying a current to said DC load from a plurality of said power cells;
  (d) selectively controlling the output of said power cells to one of a preselected positive voltage level, a preselected negative voltage level, and a generally zero voltage level;
  (e) selectively controlling a switching event of each of said power cells so that said switching event of respective one of said plurality of said power cells is spaced in time from said switching event of respective others of said plurality of power cells to produce a smooth DC output;
  (f) selectively applying at least one control signal to said plurality of said power cells so that each of said plurality of power cells conducts a current at a predetermined voltage, with a predetermined polarity, and for a predetermined duration; and
  (g) interdigitating a preselected number of carrier signals to each of said plurality of said power cells so that harmonic components in a power frequency spectrum are generally attenuated.

42. The method of claim 41 further comprising shifting in phase a plurality of said secondary power sources from said input voltage.

43. The method of claim 42 further comprising:
  (a) selectively controlling a switching event of each of said power cells so that said switching event of respective one of said plurality of said power cells is temporally separate from said switching event of respective others of said plurality of power cells;
  (b) selectively applying at least one control signal to said plurality of said power cells so that each of said plurality of power cells conducts a current at a predetermined voltage, with a predetermined polarity, and for a predetermined duration; and
  (c) interdigitating a preselected number of carrier signals to each of said plurality of said power cells so that harmonic components in a power frequency spectrum are generally attenuated.

* * * * *

UNITED STATES PATENT AND TRADEMARK OFFICE
CERTIFICATE OF CORRECTION

PATENT NO. : 5,638,263
DATED : June 10, 1997
INVENTOR(S) : Kenneth Opal, Harry Abrams, Peter Hammond It is certified that error appears in the above-indentified patent and that said Letters Patent is hereby corrected as shown below:

Column 13, claim 31, line 30, change "wing" to --winding--.

Column 14, claim 38, line 4, change "end" to --and--.

Signed and Sealed this

Twenty-third Day of September, 1997

Attest:

BRUCE LEHMAN

Attesting Officer

Commissioner of Patents and Trademarks